United States Patent
Omata et al.

(10) Patent No.: US 12,010,410 B2
(45) Date of Patent: Jun. 11, 2024

(54) MONITORING CAMERA

(71) Applicant: i-PRO Co., Ltd., Fukuoka (JP)

(72) Inventors: Akito Omata, Fukuoka (JP); Hirokazu Tasaka, Fukuoka (JP); Satoshi Kataoka, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 84 days.

(21) Appl. No.: 17/955,028

(22) Filed: Sep. 28, 2022

(65) Prior Publication Data
US 2023/0114363 A1 Apr. 13, 2023

(30) Foreign Application Priority Data

Oct. 13, 2021 (JP) .................................. 2021-168185

(51) Int. Cl.
| | | |
|---|---|---|
| *H04N 23/52* | (2023.01) | |
| *G03B 17/08* | (2021.01) | |
| *H04N 7/18* | (2006.01) | |
| *H04N 23/695* | (2023.01) | |
| *H04N 23/90* | (2023.01) | |

(52) U.S. Cl.
CPC .............. *H04N 23/52* (2023.01); *G03B 17/08* (2013.01); *H04N 7/18* (2013.01); *H04N 23/695* (2023.01); *H04N 23/90* (2023.01)

(58) Field of Classification Search
CPC ...... H04N 23/52; H04N 23/695; H04N 23/90; H04N 7/18; G03B 17/08
See application file for complete search history.

(56) References Cited

U.S. PATENT DOCUMENTS

| | | | | |
|---|---|---|---|---|
| 2015/0296108 A1* | 10/2015 | Hayakawa | ............ | B60S 1/0848 |
| | | | | 348/148 |
| 2016/0103315 A1* | 4/2016 | Weber | .................... | H04N 7/183 |
| | | | | 348/148 |
| 2016/0238838 A1 | 8/2016 | Tago | | |
| 2020/0144939 A1* | 5/2020 | Fujimoto | ........... | G02B 27/0006 |

FOREIGN PATENT DOCUMENTS

| | | |
|---|---|---|
| JP | 2015-126526 A | 7/2015 |
| WO | WO-2020022505 A1 * | 1/2020 ............. B60R 11/04 |

* cited by examiner

*Primary Examiner* — Gelek W Topgyal
(74) *Attorney, Agent, or Firm* — GREENBLUM & BERNSTEIN, P.L.C.

(57) ABSTRACT

A monitoring camera includes a plurality of camera units mounted in a circumferential direction of a device body, and a dome cover assembly including a dome cover collectively covering the plurality of camera units. The dome cover includes a water droplet guide surface continuous with an R surface and tilted downward as approaching an axis of the dome cover, and a water droplet receiving portion continuous with the water droplet guide surface. The camera unit includes a camera rotating a lens center axis on the virtual plane about a tilt rotation center in a direction perpendicular to the virtual plane. The water droplet receiving portion is provided outside of a field angle boundary of a field angle of the camera close to the axis in a state where the camera is tilted toward the axis side at a maximum tilt angle.

5 Claims, 4 Drawing Sheets

MONITORING CAMERA

CROSS-REFERENCE TO RELATED APPLICATIONS

This application is based on and claims priority under 35 USC 119 from Japanese Patent Application No. 2021-168185 filed on Oct. 13, 2021, the contents of which are incorporated herein by reference.

TECHNICAL FIELD

The present disclosure relates to a monitoring camera.

BACKGROUND ART

Patent Literature 1 discloses a monitoring camera device that removes dust, water droplets, etc. adhering to a clear dome window to clear the clear dome window such that a clear image can be captured. The monitoring camera device includes a housing body housing at least a monitoring camera, a transparent plastic hemispherical dome-shaped cover portion provided on one surface of the housing body, a wiper mechanism rotatably provided on the housing body and configured to clean the dome-shaped cover portion, and a wiper drive unit configured to reciprocate and rotate the wiper mechanism. The wiper mechanism includes a silicone-rubber-made wiper blade having an arcuate surface that follows a curved surface of the dome-shaped cover portion, and a wiper arm having both ends rotatable about a central axis parallel to a bottom surface of the dome-shaped cover portion of the housing body and having the wiper blade attached to a dome-shaped cover portion side by protruding a predetermined length.

CITATION LIST

Patent Literature

Patent Literature 1: JP2015-126526A

SUMMARY OF INVENTION

However, since a monitoring camera device in the related art includes a wiper mechanism and a wiper drive unit configured to reciprocate and rotate the wiper mechanism, there is a problem of a high product cost. In addition, in the case of attaching the monitoring camera device to a ceiling, there is a problem that a height of the device from a ceiling surface, which is an attachment surface, is increased due to mechanisms such as the wiper mechanism and the wiper drive unit (thinning is hindered).

The present disclosure has been made in view of the above situations in the related art, and an object thereof is to provide a monitoring camera capable of removing water droplets such as raindrops adhering to a dome cover and efficiently preventing deterioration of image quality due to the water droplets.

The present disclosure provides a monitoring camera including: a plurality of camera units that are mounted in a circumferential direction of a device body attached substantially parallel to a ceiling surface; and a dome cover assembly that includes a dome cover collectively covering the plurality of camera units and that is attached to the device body, in which the dome cover is formed, on a virtual plane including an axis of the dome cover and parallel to the axis, with a water droplet guide surface continuous with an R surface and tilted downward when approaching the axis, and a water droplet receiving portion continuous with the water droplet guide surface, the plurality of camera units each include a camera that rotates a lens center axis on the virtual plane about a tilt rotation center in a direction perpendicular to the virtual plane, and the water droplet receiving portion is provided on a side opposite to the lens center axis with respect to a field angle boundary of a field angle of the camera on an axis side in a state where the camera is tilted toward the axis side at a maximum tilt angle.

According to the present disclosure, it is possible to remove water droplets such as raindrops adhering to a dome cover and efficiently prevent deterioration of image quality due to the water droplets.

DESCRIPTION OF EMBODIMENTS

Hereinafter, an embodiment in which a monitoring camera according to the present disclosure is specifically disclosed will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. The accompanying drawings and the following description are provided for thorough understanding of the present disclosure by those skilled in the art, and are not intended to limit the subject matter recited in the claims.

Figure 1:
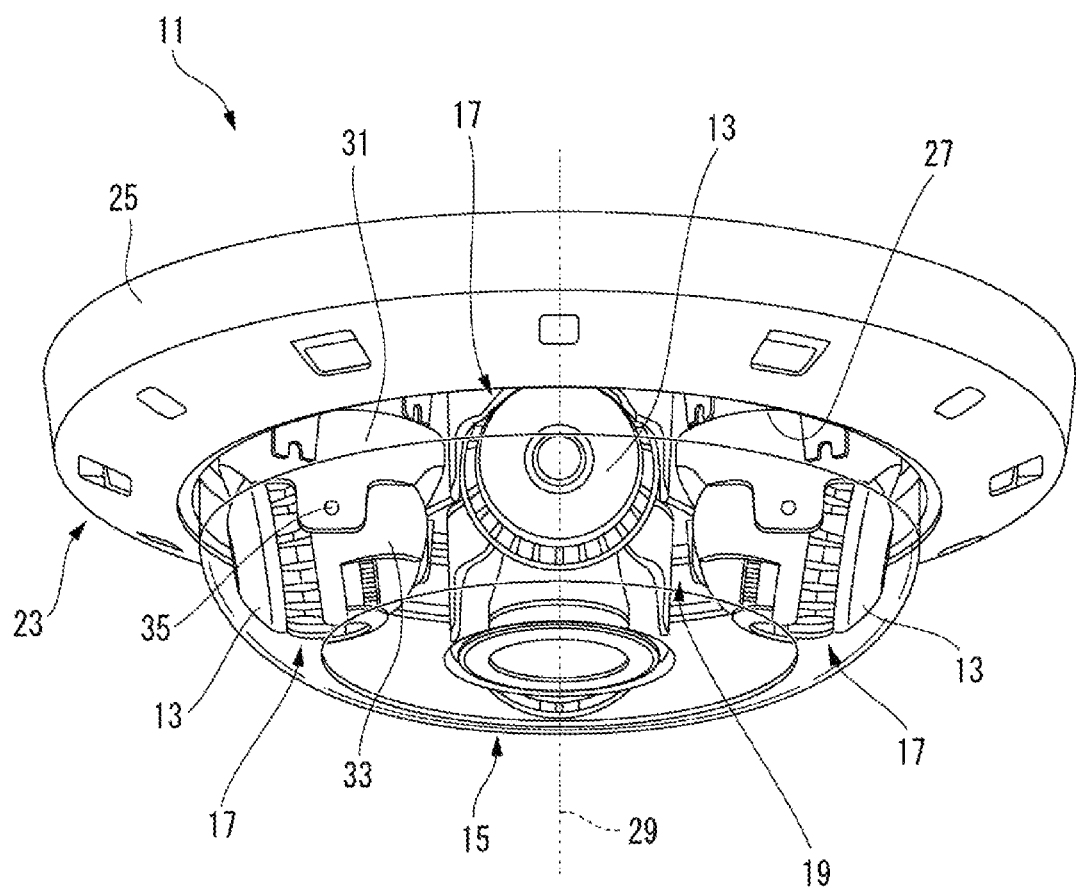
FIG. 1 is a perspective view of a monitoring camera according to a first embodiment, which is viewed obliquely from below.

FIG. 1 is a perspective view of a monitoring camera 11 according to a first embodiment, which is viewed obliquely from below.

The monitoring camera 11 according to the first embodiment is to be installed indoors or outdoors, such as on a ceiling or under eaves, and captures an image of an object to be monitored (such as people, vehicles, or motorcycles). The monitoring camera 11 is a so-called dome-shaped monitoring camera, and includes a dome cover 15 as a protective cover that covers cameras 13. The monitoring camera 11 according to the first embodiment is, for example, a multi-camera in which a plurality of camera units 17 are collectively covered with the dome cover 15. The number of the camera units 17 may be two or more, and is not limited to four shown in FIG. 1.

The monitoring camera 11 is installed by fixing a device body 19 to a substantially horizontal ceiling surface 21 (see FIG. 3) by means of an attachment metal fitting (not shown) formed of a sheet metal material in a substantially annular plate shape. A dome cover assembly 23 is fixed to the device body 19 by fixing screws (not shown), and is fixed together with the attachment metal fitting by fixing screws (not shown) penetrating the device body 19. That is, the device body 19 of the monitoring camera 11 is entirely covered with the dome cover assembly 23.

The dome cover assembly 23 includes a frame housing 25 that is annularly formed and attached to the device body 19. The frame housing 25 fixes an outer circumference of the transparent dome cover 15 to an inner hole 27 in a watertight manner.

The plurality of camera units 17 each include one camera 13. The plurality of camera units 17 each have a configuration capable of rotating the camera 13 in a predetermined imaging direction. That is, each of the plurality of camera units 17 is configured such that a user using the monitoring camera 11 can point the camera 13 in a predetermined imaging direction that the user wants to monitor (image).

The device body 19 includes the plurality of camera units 17 disposed in a circumferential direction of concentric circles centered on an axis 29. The device body 19 includes a pan base (not shown) that allows each of the plurality of camera units 17 to move freely in the circumferential direction of concentric circles centered on the axis 29.

Each of the plurality of camera units 17 is supported by the pan base via a pan chassis base (not shown), and is pan-rotatable about the axis 29 of the dome cover 15 as a center of pan rotation. The camera unit 17 is supported with respect to the pan chassis base such that a pan chassis 31 can be twist-rotated about a twist rotation center in a direction same as a panning direction.

A tilt hinge 33 is attached to the pan chassis 31. The tilt hinge 33 is supported with respect to the pan chassis 31 so as to be tilt-rotatable around a tilt rotation center 35 in a direction perpendicular to the twist rotation center. The camera 13 is attached to the tilt hinge 33. The camera 13 is supported by the tilt hinge 33 so as to be yaw rotatable around a lens center axis 37 (see FIG. 4).

Figure 2:
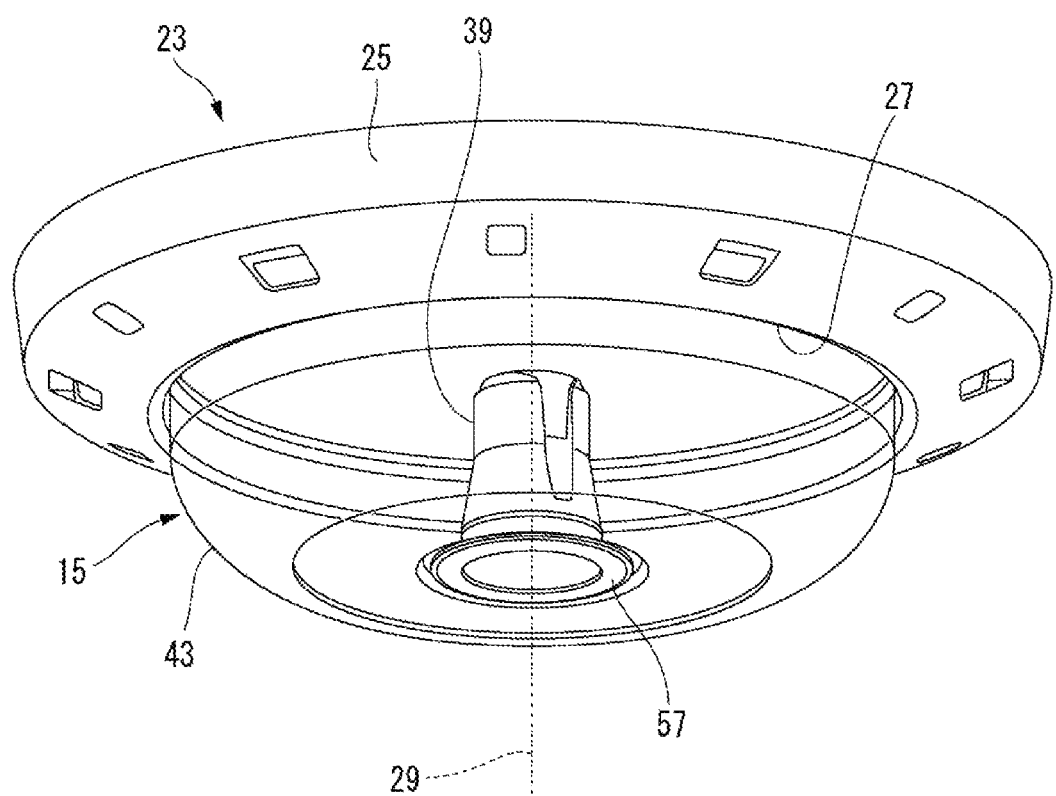
FIG. 2 is a perspective view of a dome cover assembly shown in FIG. 1.

FIG. 2 is a perspective view of the dome cover assembly 23 shown in FIG. 1.

The dome cover 15 is provided with a hydrophilic coating, and thus has excellent visibility and antifouling properties in rainy days. The dome cover 15 is formed into a bowl shape. This bowl shape is a shape of a revolution body with point symmetry about the axis 29.

The dome cover 15 includes a dome support 39 that protrudes toward an inner circumference side of the dome cover 15. The dome support 39 is provided coaxially with the axis 29.

The dome cover assembly 23 is combined (covers) and integrally assembled with the device body 19 such that a bowl-shaped inner circumference side thereof faces upward from below (direction facing the ceiling surface 21 (see FIG. 3)). The dome cover assembly 23 is installed on the ceiling surface 21 by screwing the annular frame housing 25 to the device body 19 and the ceiling surface 21 (see FIG. 3) in the circumferential direction with fixing screws or the like.

Figure 3:
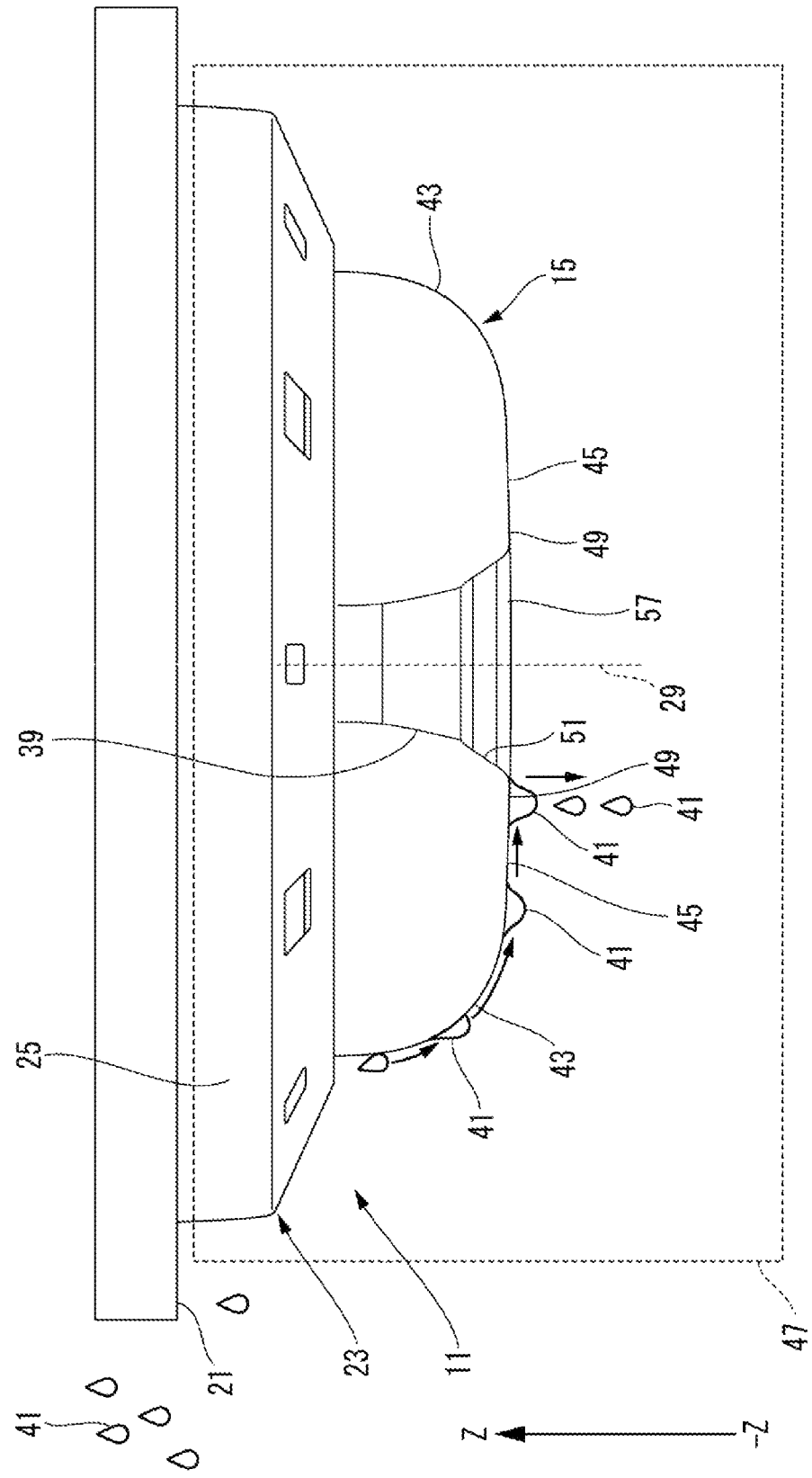
FIG. 3 is a side view exemplifying a flow direction of a water droplet in the monitoring camera shown in FIG. 1.

FIG. 3 is a side view exemplifying a flow direction of a water droplet 41 in the monitoring camera 11 shown in FIG. 1.

The dome cover 15 has an R surface 43 formed between the axis 29 and an outer circumferential portion in contact with the frame housing 25.

A water droplet guide surface 45 for guiding the water droplet 41 adhering to a surface of the dome cover 15 to a water droplet receiving portion 49 is continuous with the R surface 43. The water droplet guide surface 45 is formed, on a virtual plane 47 including the axis 29 of the dome cover 15 and substantially parallel to the axis 29, continuously with the R surface 43 and is tilted downward when approaching the axis 29. The water droplet guide surface 45 is further formed continuously with the water droplet receiving portion 49 for causing the water droplet 41 guided by the water droplet guide surface 45 to drop downward (−Z direction) of the monitoring camera 11.

As described above, in the monitoring camera 11 according to the first embodiment, the water droplet 41 adhering to the dome cover 15 flows from the R surface 43 toward the water droplet guide surface 45 due to gravity in rainy days. The water droplet 41 flowing on the water droplet guide surface 45 flows down along the water droplet guide surface 45 toward the water droplet receiving portion 49 positioned in a direction toward the axis 29. The water droplet receiving portion 49 causes the water droplet 41 flowing down and accumulating on the water droplet receiving portion 49 to drop downward (−Z direction) of the monitoring camera 11.

In the first embodiment, the dome cover 15 is coaxial with the axis 29 and includes a circular recessed portion 51 recessed in a direction toward the ceiling surface 21. Therefore, the water droplet receiving portion 49 is provided in an annular shape in a radially outer side of the circular recessed portion 51. The circular recessed portion 51 is not an essential component and may be omitted. When the circular recessed portion 51 is omitted, the water droplet receiving portion 49 may be provided on the axis 29.

Figure 4:
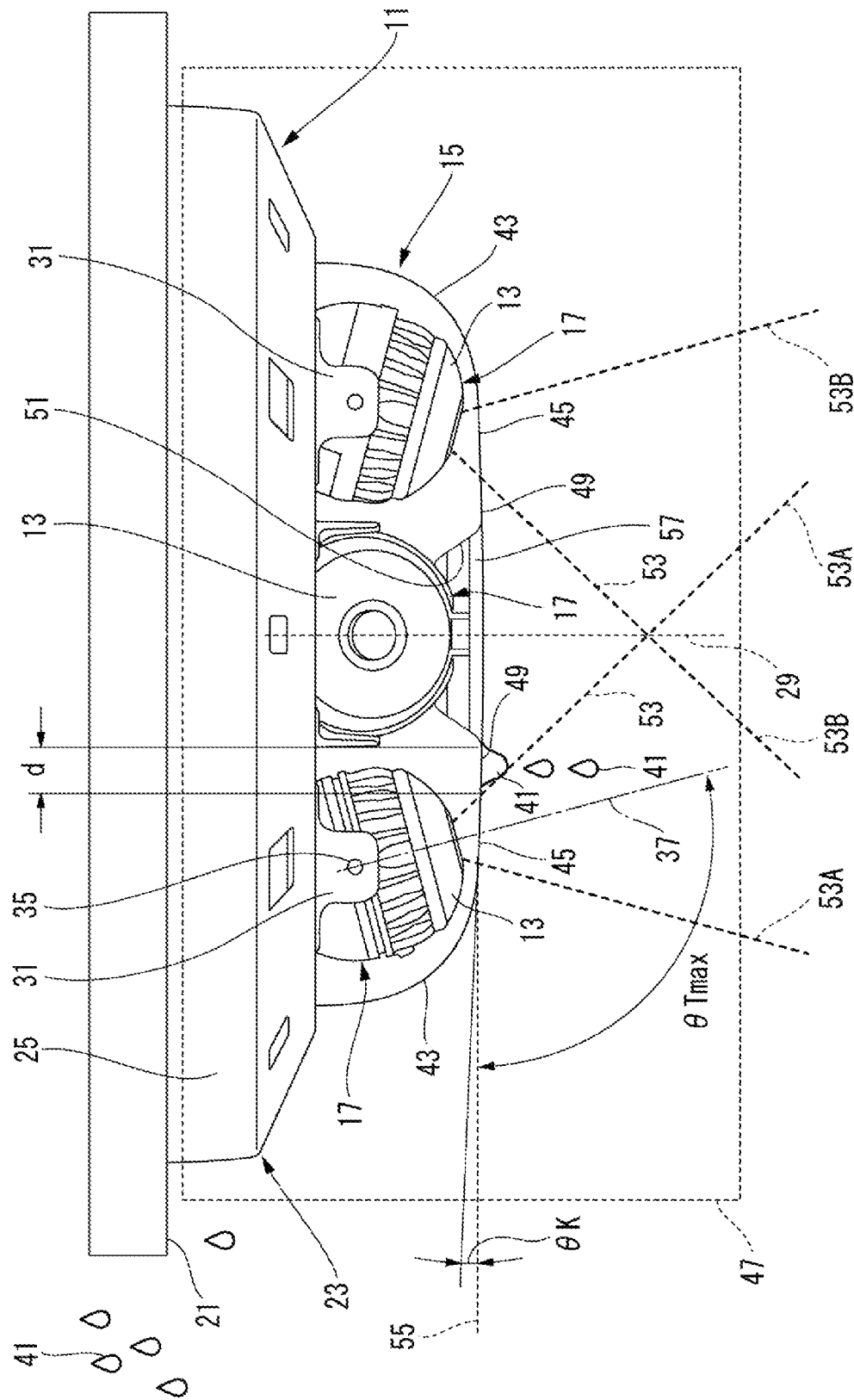
FIG. 4 is a side view showing a position of a water droplet receiving portion in the monitoring camera shown in FIG. 3.

FIG. 4 is a side view showing a position of the water droplet receiving portion 49 in the monitoring camera 11 shown in FIG. 3.

The camera 13 in each camera unit 17 rotates the lens center axis 37 on the virtual plane 47 about the tilt rotation center 35 in a direction perpendicular to the virtual plane 47 by the mechanism described above. Each of the cameras 13 shown in FIG. 4 shows a state where a field angle of the camera 13 is tilt-rotated to a maximum tilt angle θTmax toward the axis 29 (that is, approximately a central position of the dome cover 15). Each of field angles 53A and 53B indicates an imaging range of respective one of the two cameras 13 at the maximum tilt angle θTmax. In FIG. 4, only the field angles 53A and 53B of the two cameras 13 are shown, and the field angles of the other two cameras 13 are omitted for the sake of clarity.

Here, the water droplet receiving portion 49 is provided out of the field angles 53A and 53B of all the cameras 13 and on a side opposite to the lens center axis 37 with respect to a field angle boundary 53 of the field angles 53A and 53B of the camera 13 on an axis 29 side in a state where all the cameras 13 are tilt-rotated to the maximum tilt angle θTmax. In the other words, the water droplet receiving portion 49 is provided outside of the field angle boundary 53 of the field angle 53A, 53B of the camera close to the axis 29. Accordingly, the water droplet receiving portion 49 is out of a field of view of the camera 13.

In addition, the water droplet receiving portion 49 is formed with an included angle θK of 1° to 10° toward the water droplet guide surface 45 and the water droplet receiving portion 49 (i.e., the axis 29 side) with respect to a horizontal plane 55 (i.e., 0°).

In addition, the water droplet receiving portion 49 may be set to have a distance d of, for example, 10 mm or more in a direction perpendicular to the axis 29, and may be shared by the plurality of cameras 13. When the circular recessed portion 51 is omitted, the water droplet receiving portion 49 may be provided on the axis 29.

As described above, in the monitoring camera 11 according to the first embodiment, the water droplet 41 adhering to the dome cover 15 is caused to flow down to the water droplet receiving portion 49 positioned out of the field angles of all the cameras 13 and drops in rainy days. Accordingly, in the monitoring camera 11 according to the first embodiment, deterioration of the image quality of the cameras 13 caused by the water droplet 41 staying within the field angles of all the cameras 13 can be prevented more effectively.

The monitoring camera 11 according to the first embodiment includes the plurality of camera units 17 that are mounted in the circumferential direction on the device body 19 attached substantially parallel to the ceiling surface 21, and the dome cover assembly 23 that includes the dome cover 15 collectively covering the plurality of camera units 17 and that is attached to the device body 19. The dome cover 15 is formed, on the virtual plane 47 including the axis 29 of the dome cover 15 and parallel to the axis 29, with the water droplet guide surface 45 continuous with the R surface 43 and tilted downward when approaching the axis 29, and the water droplet receiving portion 49 continuous with the water droplet guide surface 45. The plurality of camera units 17 each include the camera 13 that rotates the lens center axis 37 on the virtual plane 47 about the tilt rotation center 35 in the direction perpendicular to the virtual plane 47. The water droplet receiving portion 49 is provided on the side opposite to the lens center axis 37 with respect to the field angle boundary 53 of the field angle of the camera 13 on the axis 29 side in a state where the camera 13 is tilted toward the axis 29 side at the maximum tilt angle.

In the monitoring camera 11 according to the first embodiment, the dome cover 15 is formed, on the virtual plane 47 including the axis 29 and parallel to the axis 29, with the water droplet guide surface 45 continuous with the R surface 43 and tilted downward when approaching the axis 29, and the water droplet receiving portion 49. Therefore, in the monitoring camera 11, the water droplet 41 caused by rainwater or the like adhering to a side surface of the dome cover assembly 23 or the R surface 43 of the dome cover 15 can be caused to flow down from the water droplet guide surface 45 to the water droplet receiving portion 49 positioned on the bottommost surface of the dome cover and can drop after flowing downward along the R surface 43 due to gravity and reaching the water droplet guide surface 45 continuous with the R surface 43.

Specifically, when the water droplet 41 accumulates on the water droplet receiving portion 49 provided on the side opposite to the lens center axis 37 with respect to the field angle boundary 53 of the field angle of the camera 13 on the axis 29 side on the virtual plane 47 in a state where the camera 13 is tilted to the axis 29 side at the maximum tilt angle θTmax, and the accumulated water droplet 41 drops downward due to gravity, the water droplet 41 can be prevented from staying within the field angle of each camera 13 in the monitoring camera 11. Therefore, in the monitoring camera 11 according to the first embodiment, deterioration of the image quality caused by reflection of the water droplet 41 in images captured by each camera 13 can be prevented effectively.

In addition, since the monitoring camera 11 does not require a mechanism such as a wiper mechanism and a wiper drive unit, it is possible to prevent reflection of the water droplet 41 in the captured image without increasing the product cost. Further, since the monitoring camera 11 does not require a mechanism such as a wiper mechanism and a wiper drive unit, the device body 19 is prevented from becoming large, and protrusions (for example, a wiper blade or a wiper arm) projecting from an outer circumferential surface of the dome cover 15 are unnecessary. Therefore, a height of the monitoring camera 11 from the ceiling surface 21 can be prevented from increasing in the Z direction.

As described above, in the dome cover 15 of the monitoring camera 11 according to the first embodiment, the circular recessed portion 51 recessed in the direction toward the ceiling surface 21 is formed coaxially around the axis 29, and the water droplet receiving portion 49 is provided in an annular shape on the radially outer side of the circular recessed portion 51. Accordingly, in the monitoring camera 11 according to the first embodiment, the circular recessed portion 51 formed coaxially around the axis 29 of the dome cover 15 and recessed in the direction toward the ceiling surface 21 forms the water droplet receiving portion 49 on the radially outer side of the circular recessed portion 51, which has an annular shape in a plan view. Therefore, the water droplet 41 flowing down from any direction of the dome cover 15 is likely to accumulate on the water droplet receiving portion 49. Therefore, the water droplet 41 is likely to drop from the water droplet receiving portion 49 in the monitoring camera 11.

When the water droplet receiving portion 49 in the first embodiment extends continuously from and "in parallel with" the downwardly tilted water droplet guide surface 45, a lower surface thereof has a "conical spring washer shape" with a convex side facing downward. This lower surface shape can also be said to be a truncated conical outer circumferential surface shape. The water droplet receiving portion 49 may extend continuously "horizontally" from the downwardly tilted water droplet guide surface 45. In this case, the water droplet receiving portion 49 has, for example, a "flat washer" lower surface shape.

The dome cover 15 is made of, for example, a polycarbonate resin, which has excellent moldability, transparency, and impact resistance. More specifically, when a bowl-shaped dome opening faces upward, an annular flange portion (not shown) is formed on a radially outer side of the dome opening. A substantially cylindrical straight portion is connected to the flange portion. The substantially spherical R surface 43 gradually approaching the axis 29 is connected to a lower end of the straight portion. A lower end of the R surface 43 is formed with the water droplet guide surface 45 that is titled downward when approaching the axis 29. Further, the annular water droplet receiving portion 49 is connected to a lower end of the water droplet guide surface 45.

The dome cover 15 includes the circular recessed portion 51 on an inner side of the annular water droplet receiving portion 49. In the monitoring camera 11, the water droplet receiving portion 49 and the circular recessed portion 51 are positioned out of an imaging area of the camera 13. In particular, the circular recessed portion 51 may be a non-transparent member because of having little effect on transmission of imaging light.

The dome cover 15 can be produced by resin molding (such as injection molding) using a mold. In the resin molding, a mold having a dome cover-shaped resin injection space (cavity) is used, and a molten resin is injected into this resin injection space through a gate. In this case, when the dome cover 15 having a the rotation body shape is provided with a gate (for example, a direct gate) at a radial point on the axis, use of a simple mold structure can reduce an amount of the resin used, and the molten resin can be easily injected uniformly in a radial direction, making it easier to obtain a better molded product.

In such a case, the dome cover 15 may leave marks of gate cuts on the axis. The dome cover assembly 23 can cover the circular recessed portion 51 with a non-transparent member (such as a dome central cover 57) such that the marks of gate cuts are positioned on an inner side of the circular recessed portion 51. Accordingly, in the monitoring camera 11, the marks of gate cuts can be hidden by providing the circular recessed portion 51 on the inner side of the annular water droplet receiving portion 49.

As described above, the water droplet receiving portion 49 in the monitoring camera 11 according to the first embodiment is shared by the plurality of cameras 13. Accordingly, since the monitoring camera 11 according to the first embodiment is formed to have a substantially annular surface in a plan view, it is not necessary to provide the corresponding water droplet receiving portion 49 for each camera 13. Accordingly, even when each of the cameras 13 of the monitoring camera 11 is movable in the circumferential direction of the concentric circle of the axis 29, the water droplet 41 is caused to flow down from 360° in the circumferential direction of the dome cover 15 toward the water droplet receiving portion 49, and reflection of the water droplet 41 can be more effectively prevented even at all field angles of the cameras 13, regardless of the arrangement of the cameras 13 in the circumferential direction of the dome cover 15 or rotation angles of pan rotation and tilt rotation.

When the circular recessed portion 51 is omitted, the water droplet receiving portion 49 has a substantially circular surface in a plan view, and effects same as those described above can be obtained. The water droplet receiving portion 49 extends substantially continuously from and in parallel with the downwardly tilted water droplet guide surface 45 and forms an inverted cone-shaped bottom surface with an apex pointing downward (−Z direction). The inverted cone-shaped bottom surface is provided on a side opposite to the lens center axis 37 with respect to the field angle boundary 53 of the field angle of the camera 13 on the axis 29 side. In such a case, in the monitoring camera 11, the water droplet receiving portion 49 shared by the plurality of cameras 13 can be provided at one location substantially coaxial with the axis 29, and a diameter of the dome cover 15 in a plan view can be further reduced.

As described above, the included angle θK between the water droplet guide surface 45 and the horizontal plane 55 in the monitoring camera 11 according to the first embodiment is in the range of 1° to 10°. Accordingly, the monitoring camera 11 according to the first embodiment has a downward titled lower surface where the water droplet guide surface 45 forms the included angle θK=1° to 10° with the horizontal plane 55, so that the monitoring camera 11 can be made thinner in the Z direction, and the water droplet 41 can flow well out of the field angles of the cameras 13.

As described above, the water droplet receiving portion 49 in the monitoring camera 11 according to the first embodiment has a distance d of 10 mm or more in the direction perpendicular to the axis 29. Accordingly, when the distance d, which is a radial width of the water droplet receiving portion 49, is 10 mm or more in the monitoring camera 11 according to the first embodiment, the water droplet 41 adhering to the water droplet receiving portion 49 due to surface tension can be prevented from spreading within the field angles of the cameras 13. Accordingly, since, with the water droplet receiving portion 49, a mass of the water droplet 41 accumulated in the water droplet receiving portion 49 by surface tension increases, it is easier for the adhered (accumulated) water droplet 41 to fall, and the accumulated water droplet 41 can fall before spreading within the field angles of the cameras 13.

Although various embodiments have been described above with reference to the accompanying drawings, the present disclosure is not limited to such embodiment. It will be apparent to those skilled in the art that various changes, modifications, substitutions, additions, deletions, and equivalents can be conceived within the scope of the claims, and it should be understood that these changes, modifications, substitutions, additions, deletions, and equivalents also belong to the technical scope of the present disclosure. In addition, constituent elements in the various embodiments described above may be arbitrarily combined within a range not departing from the gist of the invention.

INDUSTRIAL APPLICABILITY

The present disclosure is useful as a monitoring camera capable of removing water droplets such as raindrops adhering to a dome cover and efficiently preventing deterioration of image quality due to the water droplets.

What is claimed is:

1. A monitoring camera comprising:
   a plurality of camera units that are mounted in a circumferential direction of a device body attached substantially parallel to a ceiling surface; and
   a dome cover assembly that includes a dome cover collectively covering the plurality of camera units and that is attached to the device body, wherein
   the dome cover is formed, on a virtual plane including an axis of the dome cover and parallel to the axis, with a water droplet guide surface continuous with an R surface and tilted downward when approaching the axis, and a water droplet receiving portion continuous with the water droplet guide surface,
   each of the plurality of camera units includes a camera that rotates a lens center axis on the virtual plane about a tilt rotation center in a direction perpendicular to the virtual plane, and
   in a state where the camera is tilted toward the axis at a maximum tilt angle, the water droplet receiving portion is provided outside of a field angle boundary of a field angle of the camera close to the axis.

2. The monitoring camera according to claim 1, wherein
   the dome cover includes a circular recessed portion recessed in a direction approaching the ceiling surface and coaxially formed around the axis, and
   the water droplet receiving portion is provided in an annular shape in a radially outer side of the circular recessed portion.

3. The monitoring camera according to claim 1, wherein the water droplet receiving portion is shared by the plurality of cameras.

4. The monitoring camera according to claim 1, wherein an included angle between the water droplet guide surface and a horizontal plane is in a range of 1° to 10°.

5. The monitoring camera according to claim 1, wherein a radial width of the water droplet receiving portion is 10 mm or more.

* * * * *